United States Patent
Uchida et al.

(10) Patent No.: US 7,299,784 B2
(45) Date of Patent: Nov. 27, 2007

(54) INTERNAL COMBUSTION ENGINE

(75) Inventors: Takefumi Uchida, Susono (JP); Yutaka Iwami, Iwata (JP); Takeo Kondo, Hamamatsu (JP); Hideyuki Ishiyama, Iwata (JP)

(73) Assignees: Toyota Jidosha Kabushiki Kaisha, Aichi-ken (JP); Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/378,123

(22) Filed: Mar. 17, 2006

(65) Prior Publication Data

US 2006/0212208 A1    Sep. 21, 2006

(30) Foreign Application Priority Data

Mar. 18, 2005    (JP)    ............... 2005-080696

(51) Int. Cl.
 *F02D 41/40* (2006.01)
(52) U.S. Cl. .................. 123/305; 123/435; 701/104
(58) Field of Classification Search ............. 123/305, 123/435–436, 472, 480; 701/103–105, 110
See application file for complete search history.

(56) References Cited

U.S. PATENT DOCUMENTS

| | | |
|---|---|---|
| 3,998,614 A | 12/1976 | Schonberger et al. |
| 4,257,375 A | 3/1981 | Ulrich |
| 4,373,491 A | 2/1983 | Knapp |
| 4,526,152 A | 7/1985 | Hideg et al. |
| 4,694,808 A | 9/1987 | Peters |
| 4,926,821 A | 5/1990 | Porth et al. |
| 5,094,210 A | 3/1992 | Endres et al. |
| 5,251,582 A | 10/1993 | Mochizuki |
| 5,265,562 A | 11/1993 | Kruse |
| 5,460,128 A | 10/1995 | Kruse |

(Continued)

FOREIGN PATENT DOCUMENTS

DE    37 07 805    9/1987

(Continued)

OTHER PUBLICATIONS

PCT International Search Report, PCT/JP2006/302628, Apr. 25, 2006.

(Continued)

*Primary Examiner*—Hai Huynh
(74) *Attorney, Agent, or Firm*—Knobbe Martens Olson & Bear LLP

(57) ABSTRACT

An internal combustion engine is provided in which fuel pressure is changed and fuel injection is controlled in accordance with engine operating conditions. The internal combustion engine comprises a cylinder, a direct injection injector, a detection unit, and a control unit. The control unit includes two maps describing two factors of a fuel injection characteristic coefficient and an invalid injection period with respect to the fuel pressure of the direct injection injector. A first calculating section calculates a required fuel injection quantity. A second calculating section calculates a required fuel injection period in accordance with the required fuel injection quantity and the two factors of the fuel injection characteristic coefficient and the invalid injection period with respect to the fuel pressure. A controlling section controls the fuel injection such that the fuel is injected for the required fuel injection period.

13 Claims, 8 Drawing Sheets

U.S. PATENT DOCUMENTS

| | | | |
|---|---|---|---|
| 5,566,650 A | 10/1996 | Kruse | |
| 5,608,632 A | 3/1997 | White | |
| 5,694,902 A * | 12/1997 | Miwa et al. | 123/493 |
| 5,894,832 A | 4/1999 | Nogi et al. | |
| 5,924,405 A | 7/1999 | Hashimoto | |
| 6,024,064 A | 2/2000 | Kato et al. | |
| 6,039,029 A | 3/2000 | Nagasaka et al. | |
| 6,058,904 A | 5/2000 | Kruse | |
| 6,192,857 B1 * | 2/2001 | Shimada | 123/322 |
| 6,340,014 B1 | 1/2002 | Tomita et al. | |
| 6,405,704 B2 | 6/2002 | Kruse | |
| 6,467,465 B1 | 10/2002 | Lorts | |
| 6,539,923 B1 | 4/2003 | Mengoli | |
| 6,637,406 B2 | 10/2003 | Yamada et al. | |
| 6,647,465 B2 | 11/2003 | Kametani et al. | |
| 6,662,777 B2 | 12/2003 | Tsuchiya | |
| 6,827,064 B2 | 12/2004 | Akagi et al. | |
| 6,843,219 B2 | 1/2005 | Matsuda et al. | |
| 6,959,693 B2 | 11/2005 | Oda | |
| 6,961,651 B2 * | 11/2005 | Oshima | 701/104 |
| 7,013,874 B2 | 3/2006 | Kurayoshi et al. | |
| 7,063,070 B2 | 6/2006 | Mashiki | |
| 7,082,927 B2 | 8/2006 | Miyashita | |
| 7,121,261 B2 | 10/2006 | Kinose | |
| 2001/0027776 A1 | 10/2001 | Amou et al. | |
| 2001/0047794 A1 | 12/2001 | Kato | |
| 2004/0007209 A1 | 1/2004 | Ohtani | |
| 2005/0205067 A1 | 9/2005 | Koide et al. | |
| 2006/0207567 A1 | 9/2006 | Yamaguchi et al. | |

FOREIGN PATENT DOCUMENTS

| | | |
|---|---|---|
| EP | 0 169 481 A | 1/1986 |
| EP | 1 096 138 A2 | 5/2001 |
| EP | 1 096 138 A3 | 5/2001 |
| EP | 1 293 653 | 3/2003 |
| EP | 1 387 081 A2 | 2/2004 |
| EP | 1 396 633 A2 | 3/2004 |
| EP | 1 533 518 A1 | 5/2005 |
| GB | 2 009 843 A | 10/2001 |
| JP | 49-081719 | 8/1974 |
| JP | 63-098479 | 6/1988 |
| JP | 63-138119 | 6/1988 |
| JP | 01-240765 | 9/1989 |
| JP | 03-015622 | 1/1991 |
| JP | 03-275978 | 12/1991 |
| JP | 4-94434 | 3/1992 |
| JP | 7-247924 | 9/1995 |
| JP | 07-269394 | 10/1995 |
| JP | 7-332208 | 12/1995 |
| JP | 8-109861 | 4/1996 |
| JP | 8-121285 | 5/1996 |
| JP | 8-144889 | 6/1996 |
| JP | 09-203357 | 8/1997 |
| JP | 10-054318 | 2/1998 |
| JP | 10-115270 | 5/1998 |
| JP | 10-141194 | 5/1998 |
| JP | 10-227239 | 8/1998 |
| JP | 11-082250 | 3/1999 |
| JP | 11-132076 | 5/1999 |
| JP | 11-159424 | 6/1999 |
| JP | 11-315733 | 11/1999 |
| JP | 11-324765 | 11/1999 |
| JP | 11-350966 | 12/1999 |
| JP | 2000-97131 | 4/2000 |
| JP | 2000-97132 | 4/2000 |
| JP | 2000-130234 | 5/2000 |
| JP | 2000-240494 | 9/2000 |
| JP | 2001-115919 | 4/2001 |
| JP | 2001-164961 | 6/2001 |
| JP | 2001-248478 | 9/2001 |
| JP | 2002-047973 | 2/2002 |
| JP | 2002-048035 | 2/2002 |
| JP | 2002-195141 | 7/2002 |
| JP | 2002-227697 | 8/2002 |
| JP | 2002-317738 | 10/2002 |
| JP | 2004-027911 | 1/2004 |
| JP | 2004-028024 | 1/2004 |
| JP | 2004-270531 | 9/2004 |
| JP | 2004-308510 | 11/2004 |
| JP | 2006-57594 | 3/2006 |
| WO | WO 01/79690 A1 | 10/2001 |

OTHER PUBLICATIONS

Co-Pending U.S. Appl. No. 11/378,922, filed Mar. 17, 2006. Title: Internal Combustion Engine Provided With Double System of Fuel Injection.

Co-Pending U.S. Appl. No. 11/378,070, filed Mar. 17, 2006. Title: Internal Combustion Engine Provided With Double System of Fuel Injection.

Co-Pending U.S. Appl. No. 11/378,115, filed Mar. 17, 2006. Title: Dual-Injector Fuel Injection Engine.

* cited by examiner

| Engine load \ Engine revolution speed | Small → Large | | | | |
|---|---|---|---|---|---|
| Small | Qg11 | Qg21 | ... | ... | ... |
| ↓ | Qg12 | Qg22 | ... | ... | ... |
| | Qg13 | Qg23 | ... | ... | ... |
| | ... | ... | ... | ... | ... |
| | ... | ... | ... | ... | ... |
| Large | ... | ... | ... | ... | ... |

| Fuel pressure | P1 | P2 | ····· | Pn |
|---|---|---|---|---|
| Ka | a1 | a2 | ····· | an |
| tb | b1 | b2 | ····· | bn |

INTERNAL COMBUSTION ENGINE

CROSS REFERENCE TO RELATED APPLICATION

This application is based upon and claims the benefit of priority from prior Japanese Patent Application No. 2005-080696 filed on Mar. 18, 2005, the entire contents of which are incorporated herein by reference.

BACKGROUND OF THE INVENTION

1. Field of the Invention

The present invention relates to an internal combustion engine provided with a direct injection-type injector for directly injecting fuel into a cylinder of the engine.

2. Related Art

A conventional internal combustion engine (which may be called merely "engine" hereinlater) of this kind is, for example, disclosed in Japanese Patent Laid-open (KOKAI) Publication No. HEI 7-269394 (reference 1) and HEI 11-132076 (reference 2).

In the engine disclosed in the above reference 1 is a direct injection system in which a fuel is directly injected into a cylinder, and a fuel pressure is changed in accordance with an operation condition of the engine. The fuel is injected at a high fuel pressure at a time of a high engine revolution speed and, on the other hand, at a low fuel pressure at a time of low engine revolution speed. According to the change in the fuel pressure, a relationship between a fuel injection period (or fuel injection time) and a fuel injection quantity varies, and in the case of the high fuel pressure, the fuel injection quantity is excessively changed even when there is a small change in the fuel injection period, thereby causing deterioration in the operational performance of the engine.

Then, in such engine, the fuel pressure is set in accordance with an operating condition, and an actual fuel injection time period is calculated by multiplying a correction amount by fuel pressure (CFP) by a basic fuel injection period determined from an intake air mass and an engine revolution speed (which may be called merely engine revolution hereinafter) to thereby set the CFP to be gradually reduced in accordance with the increasing of the fuel pressure.

On the other hand, in the engine disclosed in the above prior art reference 2, a required fuel injection quantity (Qall) is calculated from an engine revolution speed and an engine load (degree of accelerator opening), and the minimum value of this required fuel injection quantity (Qall) is limited to a minimum value (Qmin) set in response to the respective fuel pressures. That is, in a case of the required fuel injection quantity (Qall) being less than the minimum value (Qmin) set in response to the fuel pressure, the fuel injection quantity is stabilized by making coincident this required fuel injection quantity with the minimum value (Qmin), and on the other hand, in a case of the required fuel injection quantity (Qall) being more than the minimum value (Qmin), the required fuel injection quantity is applied as it is as the fuel injection quantity. At this time, an invalid injection period may be set in response to the fuel pressure.

However, in the prior art technology of the reference 1, the correction based on the fuel pressure is carried out by using one coefficient map, by which high precision control of the fuel injection quantity cannot be expected.

Furthermore, the prior art technology of the reference 2 relates to a case where the required fuel injection quantity is in the level of small quantity, and in fact, it is disclosed that "if the required fuel injection quantity (Qall) is less than the minimum value (Qmin), the fuel injection is controlled and limited to the minimum value (Qmin)." The reference 2 merely explains about control and limitation in a local narrow region, and on the other hand, it is also disclosed that the invalid injection period is set in response to the fuel pressure, but such setting method or process is not comprehended from the disclosure even by a person skilled in the art.

According to the above prior art technology, in summary, a highly accurate fuel injection quantity control in an overall operation region or area of the engine cannot be expected.

SUMMARY OF THE INVENTION

It is therefore an object of the present invention to substantially eliminate defects or drawbacks encountered in the prior art technology mentioned above and to provide an internal combustion engine capable of carrying out an accurate fuel injection control over an entire operation range or region.

This and other objects can be achieved according to the present invention by providing an internal combustion engine in which a fuel pressure is changed and a fuel injection quantity is controlled in accordance with an engine operating condition when a fuel injection is performed, the internal combustion engine comprising:

a cylinder;

a direct injection injector arranged so as to supply the fuel to the cylinder;

a detection unit for detecting an operating condition of the internal combustion engine; and a control unit for controlling the fuel injection, including:

two maps describing two factors of an injection characteristic coefficient (Ka) and an invalid injection period (tb) with respect to the fuel pressure of the direct injection injector;

a first calculating section for calculating a required fuel injection quantity (Q) necessary for injecting the fuel into the cylinder in accordance with an information from the detection unit;

a second calculating section for calculating a required fuel injection period (T) in accordance with the required fuel injection quantity (Q) and the two factors of the injection characteristic coefficient (Ka) and the invalid injection period (tb) with respect to the fuel pressure, both of which are obtained from the two maps; and a controlling section for controlling the fuel injection such that the fuel is injected for the required fuel injection period (T) through the direct injection injector.

In a preferred embodiment of the above aspect of the invention, the required fuel injection quantity (Q) is decided in accordance with the operating condition of the internal combustion engine including at least an engine revolution speed, engine load and a fuel temperature.

The engine load is obtained from at least one of factors of an intake air quantity, accelerator opening and intake pipe negative pressure.

It may be desired that, in a case that the fuel pressure value at the time of fuel injection of the direct injection injector does not exist on a lattice point of the map, the injection characteristic coefficient (Ka) and the invalid injection period (tb) is obtained by interpolating from a neighbor lattice point.

According to the present invention mentioned above, two coefficient maps concerning the injection characteristic coefficient and the invalid injection period are adopted with respect to the fuel pressure, so that the accurate fuel injection period with substantially no error can be obtained and it becomes possible to accurately control the fuel injection quantity over the entire engine operation range.

In addition, according to the present invention, even in the case where the fuel pressure value at the time of injection of the direct injection injector does not exist on the map by which two coefficients or factors with respect to the fuel pressure, the two coefficients can be obtained by interpolated respective value of two coefficients of neighbour lattices to thereby obtain an accurate injection period with no error.

The nature and further characteristic features of the present invention will be made more clear from the following descriptions made with reference to the accompanying drawings.

DESCRIPTION OF THE PREFERRED EMBODIMENT

Figure 1:
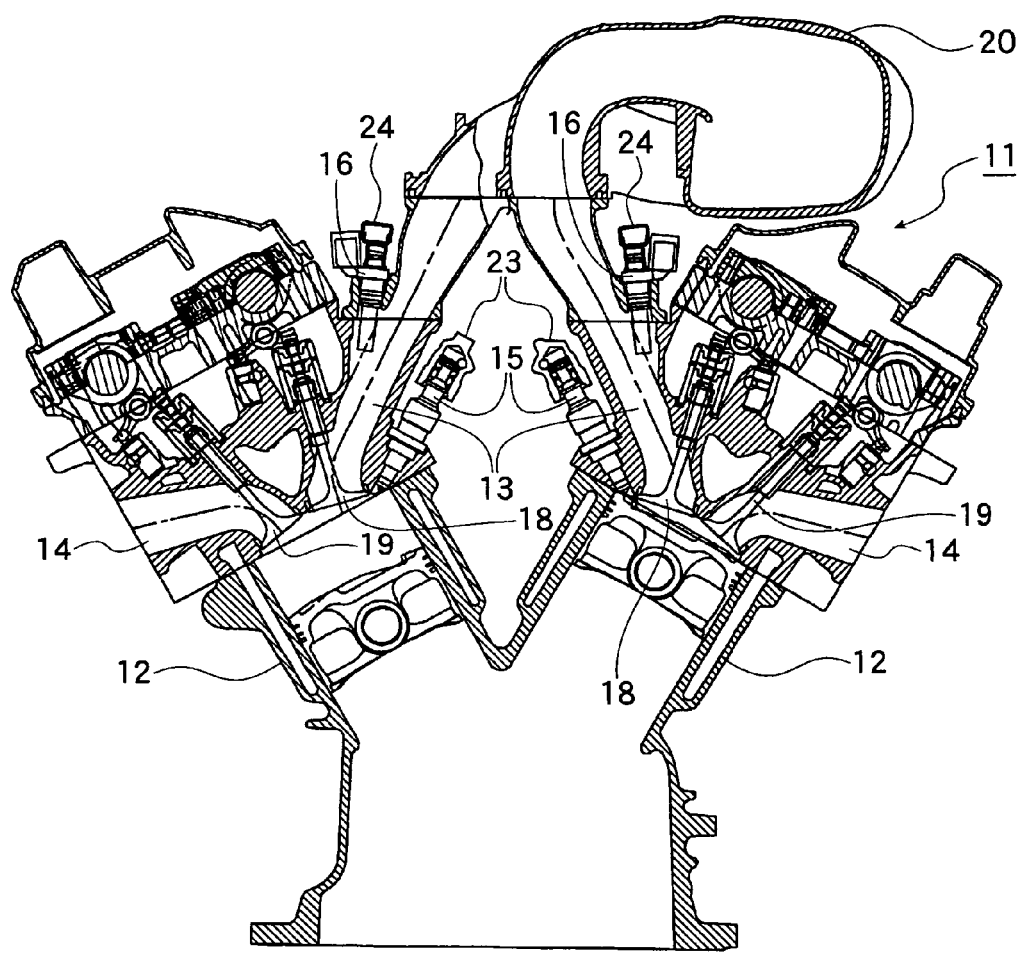
FIG. 1 is a sectional view, i.e., elevational section, of an internal combustion engine according to one embodiment of the present invention.
Figure 2:
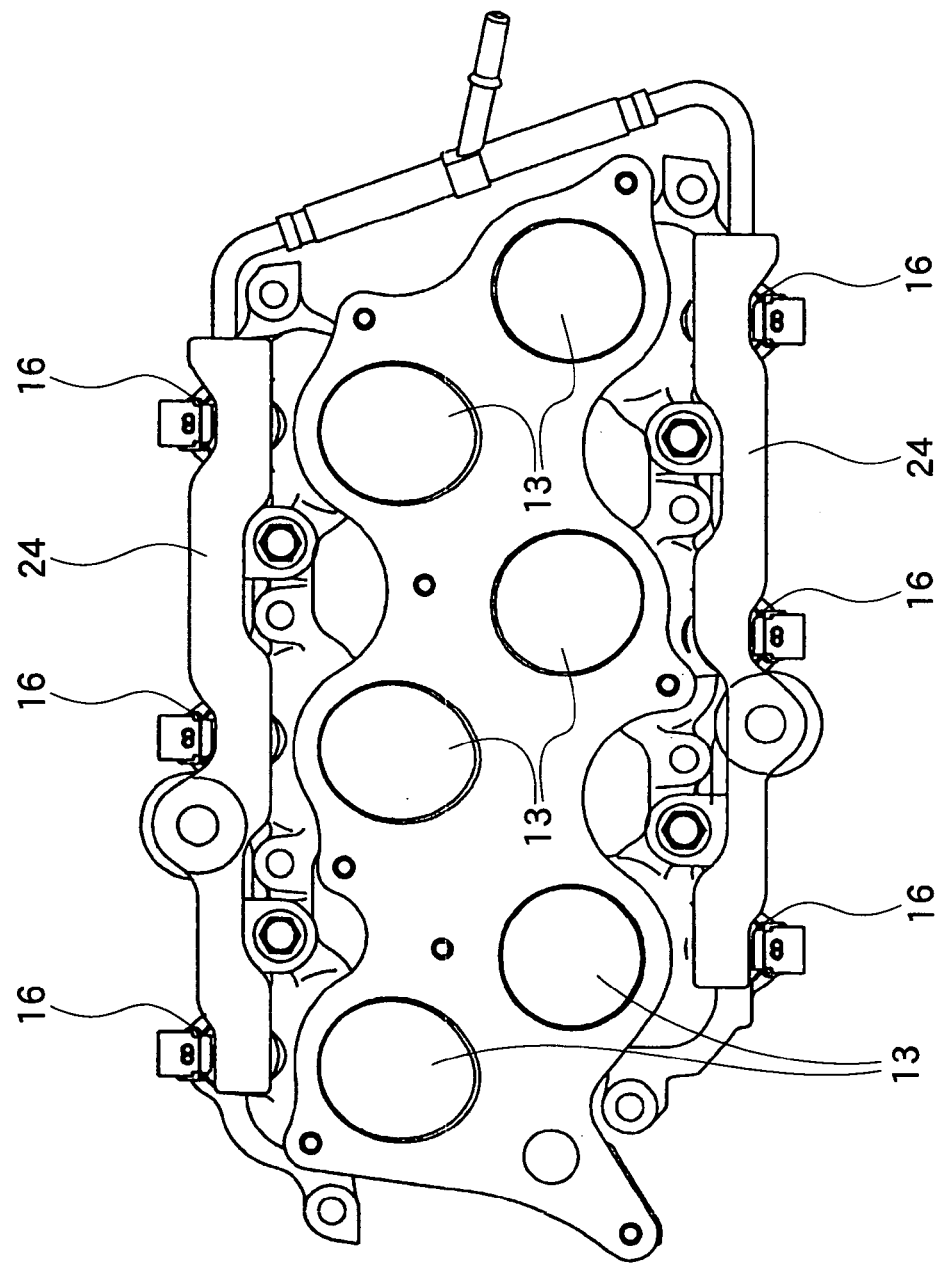
FIG. 2 is a plan view of a block diagram in which a PFI injector is set in the above embodiment of FIG. 1.
Figure 3:
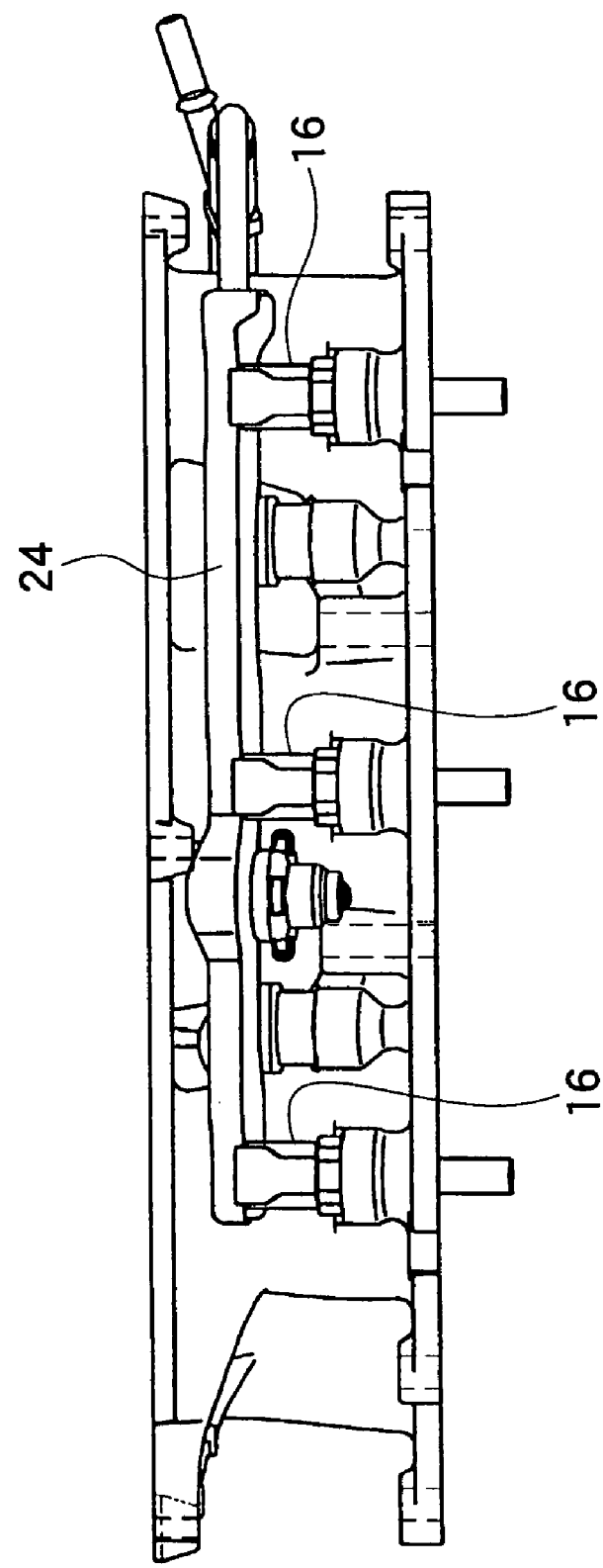
FIG. 3 is a front view of FIG. 2.

One preferred embodiment according to the present invention will be described hereunder with reference to the accompanying drawings.

With reference to FIGS. 1 to 10, reference numeral 11 denotes a V-type 6-cylinder engine as an "internal combustion engine" of the present invention, in which an intake port 13 and an exhaust port 14 are connected to each of the cylinders 12, which is in addition provided with a direct injection-type injector (DI injector) 15 and an intake pipe (manifold) injection injector (PFI injector) 16.

The fuel is directly injected into the cylinder (combustion chamber) 12 from the DI injector 15 and is then mixed with air in the cylinder 12, and in addition, the fuel is injected into the intake port 13 through the PFI injector 16 and is then mixed with air passing in the intake port 13. The thus mixed fuel is sucked in the cylinder 12 and burnt therein by an ignition of an ignition plug, not shown, at a predetermined timing.

Further, each of the cylinders 12 is also provided with an intake valve 18 for opening or closing the intake port and an exhaust valve 19 for opening or closing the exhaust port, and by opening the intake valve 18, a clean air is introduced into the cylinder 12 (combustion chamber), from a serge tank 20 through the intake port 13.

As shown in FIGS. 1 to 4, the respective DI injectors 15 in the respective cylinders 12 are coupled with each other through direct injection delivery pipes (DI delivery pipes) 23, and the respective PFI injectors 16 are also coupled with each other through port fuel injection delivery pipes (PFI delivery pipes) 24. The DI delivery pipes 23 are connected through a direct injection conduit (DI conduit) 26 so that the injected fuel circulates to a fuel tank 28, and the PFI delivery pipes 24 are connected to the fuel tank 28 through an intake pipe injection conduit (PFI conduit) 27.

Figure 4:
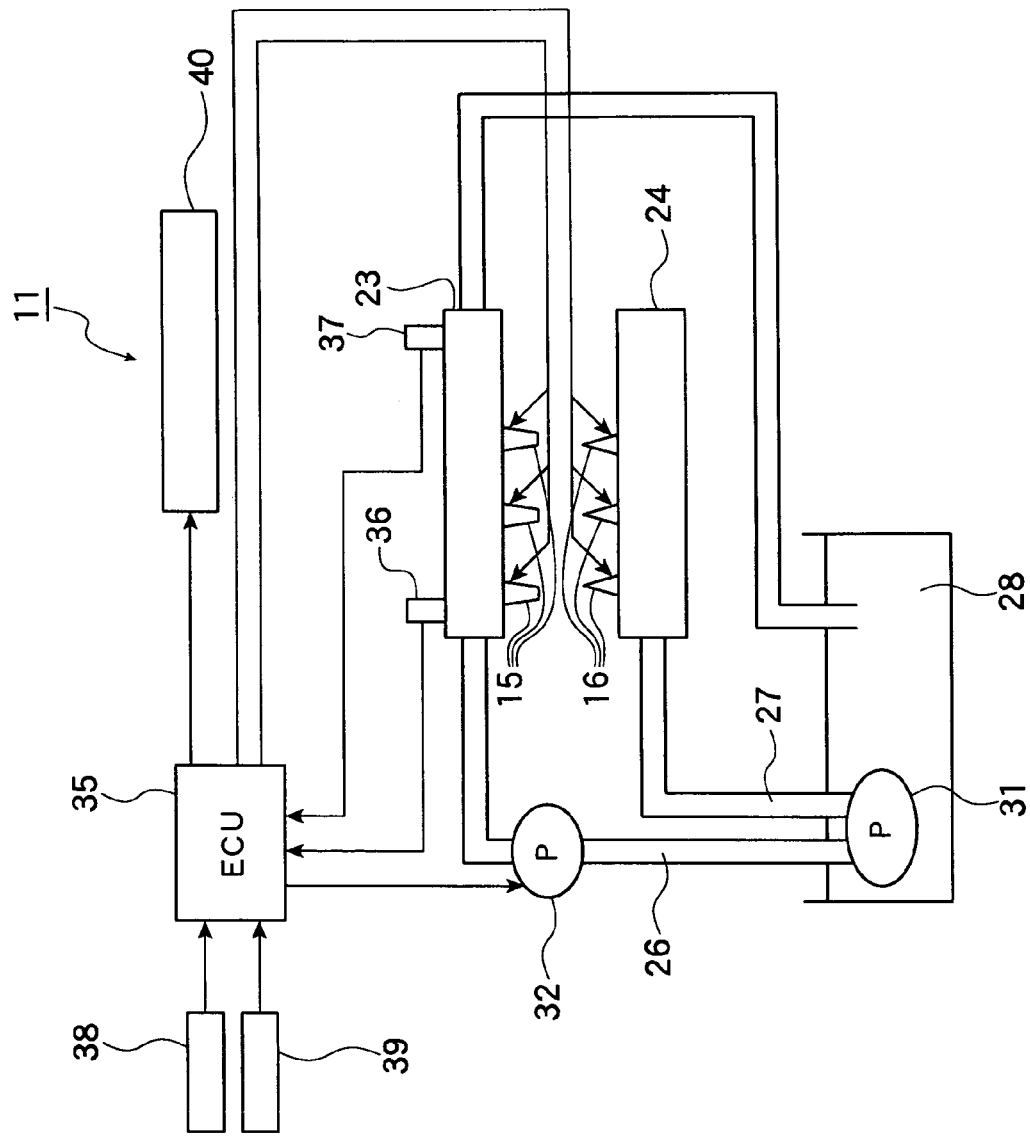
FIG. 4 is a block diagram of the internal combustion engine of this embodiment.

As shown in FIG. 4, the fuel is delivered, at a predetermined high pressure, to the DI delivery pipe 23 by means of a fuel pump 31 and a high pressure pump 32, and the fuel is also delivered, at a pressure lower than that on the DI delivery pipe side, to the PFI delivery pipe 24 by means of fuel pump 31. For the DI injector 15, in order to directly inject fuel in the high pressurized cylinder 12, a high pressure is required.

When valves (not shown) is opened for a predetermined period (fuel injection period), the injectors 15 and 16 is designed to inject a predetermined amount of fuel that is sent under a predetermined fuel pressure by pumps 31, 32.

These injectors 15 and 16 are connected to an engine control unit (ECU) 35 as "control means" so as to control opening (or closing) timing and opening (or closing) time interval of the respective valves.

A fuel pressure sensor 36 and a fuel temperature sensor 37 incorporated to the DI delivery pipe 23 are connected to the ECU 35, as well as an engine revolution speed sensor 38 for detecting the engine revolution speed and an engine load sensor 39 for detecting the engine load. These sensors 38, 39 and their associated elements constitute a "detection unit".

As such engine load sensor 39, there may be utilized, for example, a sensor for detecting intake air quantity, a sensor for detecting an accelerator opening, a sensor for detecting an intake pipe negative pressure or the like.

Furthermore, various actuators 40 are also connected to the ECU 35 to thereby control these actuators 40 in response to signals from the ECU 35.

Figures 6, 7:
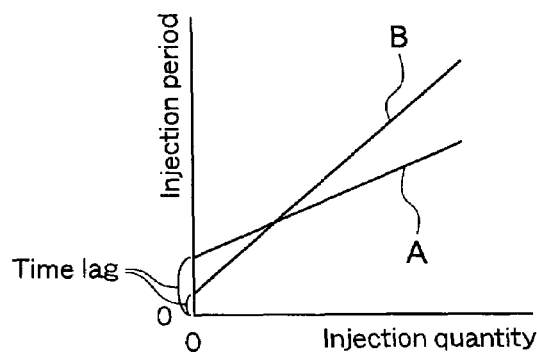
FIG. 6 is a graph representing a relationship between a fuel injection period and a fuel injection quantity with respect to the fuel pressure according to the embodiment of this invention.
FIG. 7 is a map in which the fuel injection quantity is determined based on the engine revolution speed and engine load.

According to the operation of the ECU 35, the fuel pressure is changed in accordance with the engine operating condition at the time of fuel injection and the fuel injection quantity is controlled. For example, as shown in FIG. 6, at the time of high fuel pressure, the degree of opening of the valve of the DI injector 15 is delayed than that at the time of low fuel pressure, and a characteristic line A at the high fuel pressure has an inclination smaller than that of a characteristic line B at the low fuel pressure. Accordingly, because the fuel injection period and the fuel injection quantity are changed in response to the fuel pressure, it is necessary to control the fuel injection quantity to a predetermined value.

More specifically, in accordance with information from the respective sensors 36 to 39, a required fuel injection quantity (Q) necessary for the injection into the cylinder 12 is calculated at a "first calculating section" in the ECU 35, and required fuel injection period T is calculated at a "second calculating section" in the ECU 35 from the following expression (1) from the required fuel injection quantity (Q) and an injection characteristic coefficient (Ka) and invalid injection period (tb), both of which are obtained from 2 kinds of maps between a fuel pressure in the DI injector 15 and two factors of the fuel injection characteristic coefficient (Ka) and invalid injection period (tb). The two kinds of maps are incorporated in the ECU 35.

$$T = Ka \times Q + tb \quad (1)$$

In the above expression (1), the required fuel injection quantity (Q) is determined by the engine operating condition including at least the engine revolution, engine load and fuel temperature. That is, by obtaining the engine revolution speed and the engine load, a fuel injection quantity (Qg) is obtained from the map shown in FIG. 7. And the required fuel injection quantity (Q) is obtained from this fuel injection quantity (Qg) in additional consideration of the fuel temperature. As the temperature of the fuel becomes high, fuel density becomes low, so that an optimum engine combustion is not performed with the fuel injection quantity (Qg) obtained only from the engine revolution speed and engine load, and therefore, it becomes necessary to correct the fuel injection quantity (Qg) according to the following expression (2).

$$Q = Qg \times 1/d \quad (2)$$

(d: coefficient of fuel temperature)

For this expression, any one of intake air quantity, accelerator opening and intake pipe negative pressure may be used as the engine load.

Figures 8, 9:
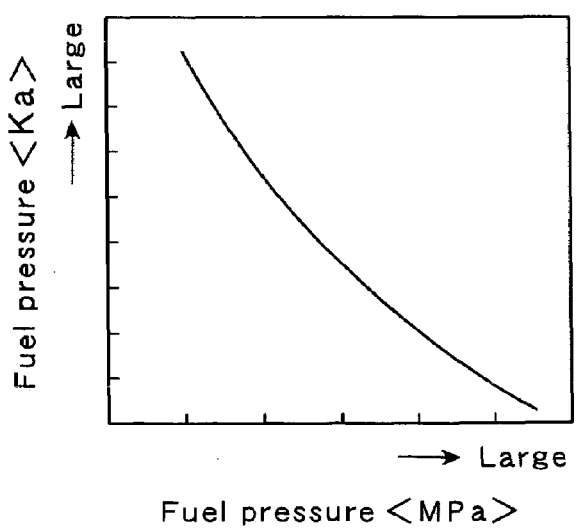
FIG. 8 is a map in which an injection characteristic coefficient (Ka) based on the fuel pressure and an invalid injection period (tb) are determined.
FIG. 9 is a graph indicating the relationship between the fuel pressure and the injection characteristic coefficient (Ka) according to DI injector characteristics.

The injection characteristic coefficient (Ka) with respect to the fuel pressure of the DI injector 15 is determined based on the map represented by FIG. 8.

For example, a value (an) of the injection characteristic coefficient (Ka) with respect to a value of the fuel pressure (Pn) on a lattice point of the map is preliminary determined.

Further, the invalid injection period (tb) with respect to a value of the fuel pressure of the DI injector 15 is determined based on the map represented by FIG. 8. For example, a value (bn) of the invalid injection period (tb) with respect to a value of the fuel pressure (Pn) is preliminarily determined.

Figure 10:
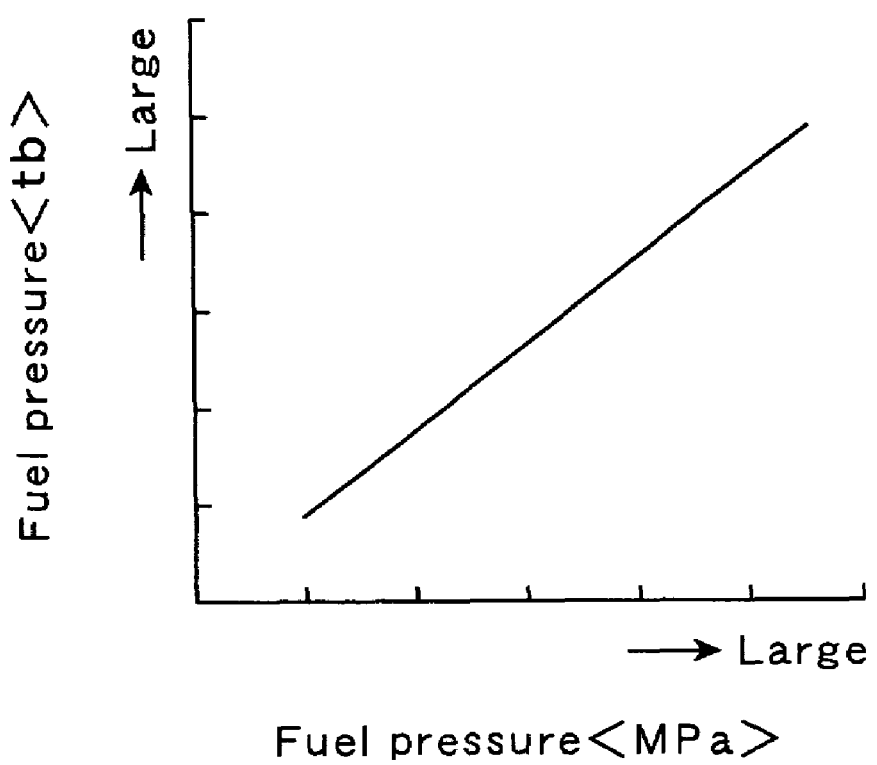
FIG. 10 is a graph indicating the relationship between the fuel pressure and the invalid injection period (tb) according to the DI injector characteristics.

Further, the map of FIG. 8 is prepared by the correlation diagram of fuel pressure—Ka of FIG. 9 and the correlation diagram of fuel pressure—tb of FIG. 10, which are determined by the characteristics of the injector to be used.

Herein, the invalid injection period (tb) means the following time or time period. That is, the DI injector 15 injecting the fuel has a time lag To in operation between the time point of the start of application of driving voltage and the time point of the start of valve opening, and also includes a time lag Tc in operation between the time point of the shut-down of the driving voltage and the time point of the valve closing time, the time lag To being longer than the time lag Tc. Accordingly, the time at which the valve is opened is shorter than the time at which the driving voltage is applied. In this connection, the time "To-Tc", at which the fuel is not injected, is called invalid injection period or time period.

Furthermore, in the case where the fuel pressure value at the time of fuel injection of the DI injector 15 does not exist on a lattice point of the map, by linear interpolation from neighbor lattice points, the injection characteristic coefficient (Ka) and invalid injection period (tb) are obtained.

A "controlling section" in the ECU 35 serves to apply the driving voltage so as to open the DI injector 15 and then to inject fuel.

Figure 5:
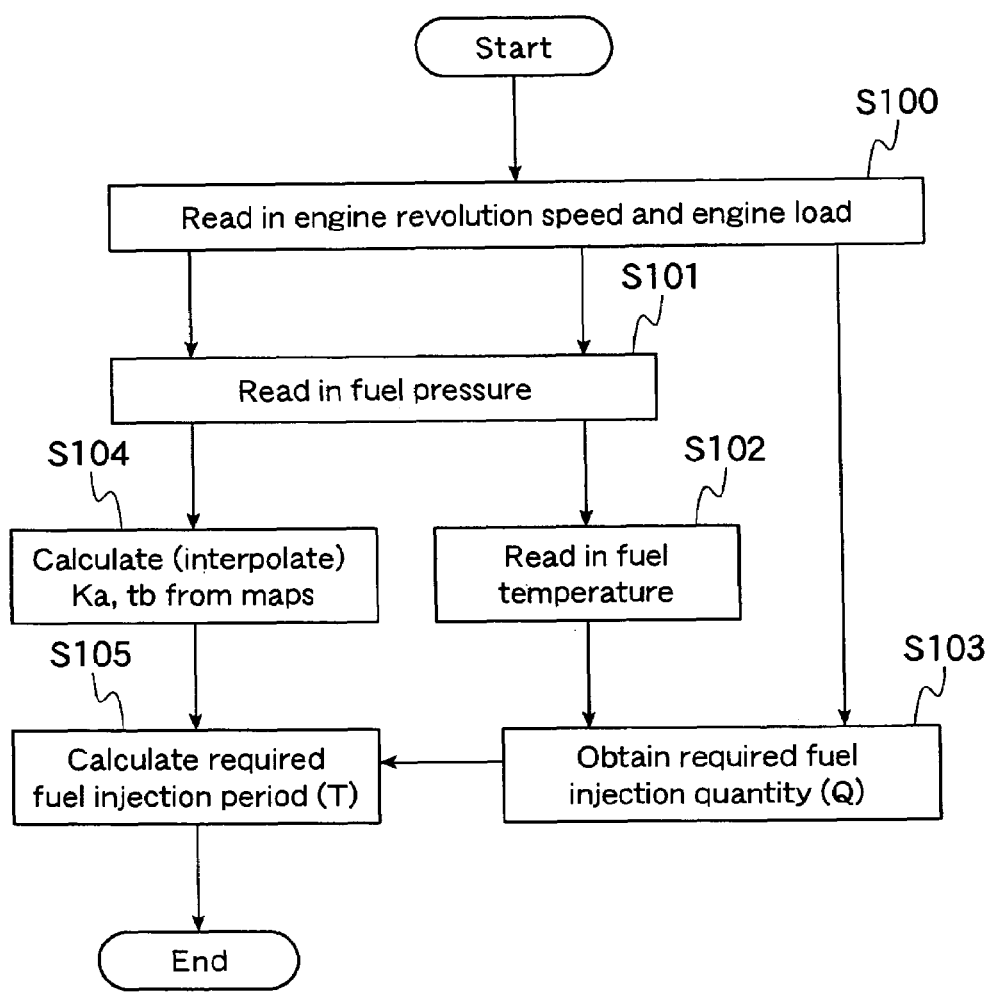
FIG. 5 is a flowchart for obtaining a required fuel injection time period according to the above embodiment.

The operation of the internal combustion engine of the structure mentioned above will be described hereunder with reference to the flowchart of FIG. 5.

In the state of the engine operation, signals representing the engine revolution and engine load are fed to the ECU 35 from the sensors 38 and 39, respectively (step S100). In step S101, the fuel pressure in the DI delivery pipe 23 is read in the ECU 35 in response to a signal from the fuel pressure sensor 36. In step S102, the fuel temperature in the DI delivery pipe 23 is fed to the ECU 35 in response to a signal from the fuel temperature sensor 37.

Next, in step S103, the required fuel injection quantity (Q) which is now required for the engine operation is calculated based on the signals from the respective sensors 36 to 39.

In this operation, the fuel injection quantity (Qg) is obtained for example with reference to the map of FIG. 7 by the detection of the engine revolution speed and engine load, and the required fuel injection quantity (Q) is then obtained from this fuel injection quantity (Qg) and the fuel temperature in addition. When the fuel temperature becomes high, the fuel density becomes low, and accordingly, the optimum engine combustion cannot be performed only by the fuel injection quantity calculated from the engine revolution speed and engine load, and the fuel injection quantity (Qg) is corrected as shown by the expression (2) in response to the change in fuel temperature.

In the following step S104, the injection characteristic coefficient (Ka) and invalid injection period (tb) are obtained with reference to the map shown in FIG. 8 on the basis of the fuel pressure value. In this step, in the case where the fuel pressure value at the injection time of the DI injector 15 does not exist on the lattice point, the linear interpolation is effected from the map, and then, the injection characteristic coefficient (Ka) and the invalid injection period (tb) are obtainable.

After this step, in step S105, the required fuel injection period (T) is calculated by substituting, in the equation (1), the injection characteristic coefficient (Ka) and the invalid injection period (tb) calculated in the step S104 and the required fuel injection quantity (Q) calculated in the step S103.

A signal representing the required fuel injection period (T) is transmitted from the ECU 35 to the DI injector 15, in which the DI injector valve is opened by the time period of (T) to thereby inject the fuel.

According to the injection steps of the internal combustion engine of the present invention, the fuel injection period can be obtained at high precision substantially with no error by adopting two coefficient maps, with respect to the fuel pressure, of the injection characteristic coefficient and the invalid injection period, and it becomes therefore possible to accurately control the fuel injection quantity over the entire operation region or area of the engine.

Furthermore, in the case that the fuel pressure value at the time of fuel injection of the DI injector 15 does not exist as the lattice point on the map determining two coefficients with respect to the fuel pressure, by interpolating two coefficients respectively, the precise injection period can be obtained with no error.

Further, although, in the described embodiment, the engine provided with the DI injectors 15 and the PFI injectors 16 is described, the present invention is not limited to such embodiment, and the present invention may be applied to an internal combustion engine provided only with the DI injectors.

What is claimed is:

1. An internal combustion engine in which a fuel pressure is changed and a fuel injection quantity is controlled in accordance with an engine operating condition when a fuel injection is performed, the internal combustion engine comprising:
- a cylinder;
- a direct injection injector arranged so as to supply the fuel to the cylinder;
- a detection unit for detecting an operating condition of the internal combustion engine; and
- a control unit for controlling the fuel injection, including:
- two maps describing two factors of a fuel injection characteristic coefficient and an invalid injection period with respect to the fuel pressure of the direct injection injector;
- a first calculating section for calculating a required fuel injection quantity necessary for injecting the fuel into the cylinder in accordance with an information from the detection unit;
- a second calculating section for calculating a required fuel injection period in accordance with the required fuel injection quantity and the two factors of the fuel injection characteristic coefficient and the invalid injection period with respect to the fuel pressure, both of which are obtained from the two maps; and
- a controlling section for controlling the fuel injection such that the fuel is injected for the required fuel injection period through the direct injection injector.

2. The internal combustion engine according to claim 1, wherein the required fuel injection quantity is decided in accordance with the operating condition of the internal combustion engine including at least an engine revolution speed, engine load and a fuel temperature.

3. The internal combustion engine according to claim 2, wherein the engine load is obtained from at least one of factors of an intake air quantity, accelerator opening and intake pipe negative pressure.

4. The internal combustion engine according to claim 3, wherein in a case that the fuel pressure value at the time of fuel injection of the direct injection injector does not exist on a lattice of the map, the fuel injection characteristic coefficient and the invalid injection period is obtained by interpolating from a neighbor lattice.

5. The internal combustion engine according to claim 2, wherein in a case that the fuel pressure value at the time of fuel injection of the direct injection injector does not exist on a lattice of the map, the fuel injection characteristic coefficient and the invalid injection period is obtained by interpolating from a neighbor lattice.

6. The internal combustion engine according to claim 1, wherein in a case that the fuel pressure value at the time of fuel injection of the direct injection injector does not exist on a lattice of the map, the fuel injection characteristic coefficient and the invalid injection period is obtained by interpolating from a neighbor lattice.

7. An internal combustion engine in which a fuel pressure is changed and a fuel injection quantity is controlled in accordance with an engine operating condition when a fuel injection is performed, the internal combustion engine comprising:
- a cylinder;
- a direct injection injector arranged so as to supply the fuel to the cylinder;
- a detection unit for detecting an operating condition of the internal combustion engine; and
- a control unit for controlling the fuel injection, including:
- two maps describing two factors of a fuel injection characteristic coefficient (Ka) and an invalid injection period (tb) with respect to the fuel pressure of the direct injection injector;
- a first calculating section for calculating a required fuel injection quantity (Q) necessary for injecting the fuel into the cylinder in accordance with an information from the detection unit;
- a second calculating section for calculating a required fuel injection period (T) in accordance with the required fuel injection quantity and the two factors of the fuel injection characteristic coefficient and the invalid injection period with respect to the fuel pressure, both of which are obtained from the two maps, according to the equation $T = Ka \times Q + tb$; and
- a controlling section for controlling the fuel injection such that the fuel is injected for the required fuel injection period through the direct injection injector.

8. The internal combustion engine according to claim 7, wherein the required fuel injection quantity (Q) is calculated according to the equation $Q = Qg \times 1/d$, where Qg is the fuel injection quantity obtained from a map of the engine revolution speed and the engine load, and d is the coefficient of fuel temperature.

9. The internal combustion engine according to claim 7, wherein in a case that the fuel pressure value at the time of fuel injection of the direct injection injector does not exist on a lattice of the map, the fuel injection characteristic coefficient and the invalid injection period is obtained by interpolating from a neighbor lattice.

10. The internal combustion engine according to claim 7, wherein the required fuel injection quantity is decided in accordance with the operating condition of the internal combustion engine including at least an engine revolution speed, engine load and a fuel temperature.

11. The internal combustion engine according to claim 10, wherein the engine load is obtained from at least one of factors of an intake air quantity, accelerator opening and intake pipe negative pressure.

12. The internal combustion engine according to claim 11, wherein in a case that the fuel pressure value at the time of fuel injection of the direct injection injector does not exist on a lattice of the map, the fuel injection characteristic coefficient and the invalid injection period is obtained by interpolating from a neighbor lattice.

13. The internal combustion engine according to claim 10, wherein in a case that the fuel pressure value at the time of fuel injection of the direct injection injector does not exist on a lattice of the map, the fuel injection characteristic coefficient and the invalid injection period is obtained by interpolating from a neighbor lattice.

* * * * *

UNITED STATES PATENT AND TRADEMARK OFFICE
CERTIFICATE OF CORRECTION

PATENT NO. : 7,299,784 B2  Page 1 of 1
APPLICATION NO. : 11/378123
DATED : November 27, 2007
INVENTOR(S) : Uchida et al.

It is certified that error appears in the above-identified patent and that said Letters Patent is hereby corrected as shown below:

In Column 2, page 2, please add --Co-pending U.S. Patent Application No. 11/086,270, filed March 22, 2005, 'Fuel Supply System and Vehicle'-- under OTHER PUBLICATIONS.

Signed and Sealed this

Seventeenth Day of June, 2008

JON W. DUDAS
*Director of the United States Patent and Trademark Office*